United States Patent [19]

DePuy

[11] 4,004,201
[45] Jan. 18, 1977

[54] MULTI-FUNCTION SOLID STATE TRIP UNIT WITH TRIP INDICATING MEANS

[75] Inventor: Robert P. DePuy, Cherry Hill, N.J.

[73] Assignee: General Electric Company, New York, N.Y.

[22] Filed: Aug. 25, 1975

[21] Appl. No.: 607,186

[52] U.S. Cl. ............................. 317/33 SC; 317/31; 340/253 R
[51] Int. Cl.² ......................................... H02H 7/00
[58] Field of Search ................... 317/16, 31, 33 SC; 340/253 R, 253 A, 253 H, 225

[56] References Cited

UNITED STATES PATENTS

| | | | |
|---|---|---|---|
| 2,341,932 | 2/1944 | MacCarthy | 317/16 X |
| 3,171,112 | 2/1965 | Martin | 340/253 R |
| 3,573,556 | 4/1971 | Zocholl | 317/33 SC |
| 3,660,724 | 5/1972 | Berger | 317/16 |
| 3,735,215 | 5/1973 | Conrad | 317/33 SC |
| 3,803,455 | 4/1974 | Willard | 317/33 SC |

*Primary Examiner*—Harry Moose
*Attorney, Agent, or Firm*—Robert A. Cahill; Walter C. Bernkopf; Frank L. Neuhauser

[57] ABSTRACT

A multi-function solid state trip unit for automatic electric circuit breakers incorporates indicators functioning to signal which of the functions, e.g., short circuit, overload or ground fault, was operative in tripping the circuit breaker. A bypass circuit is included to insure that tripping of the circuit breaker is not jeopardized by failure of the indicators.

1 Claim, 1 Drawing Figure

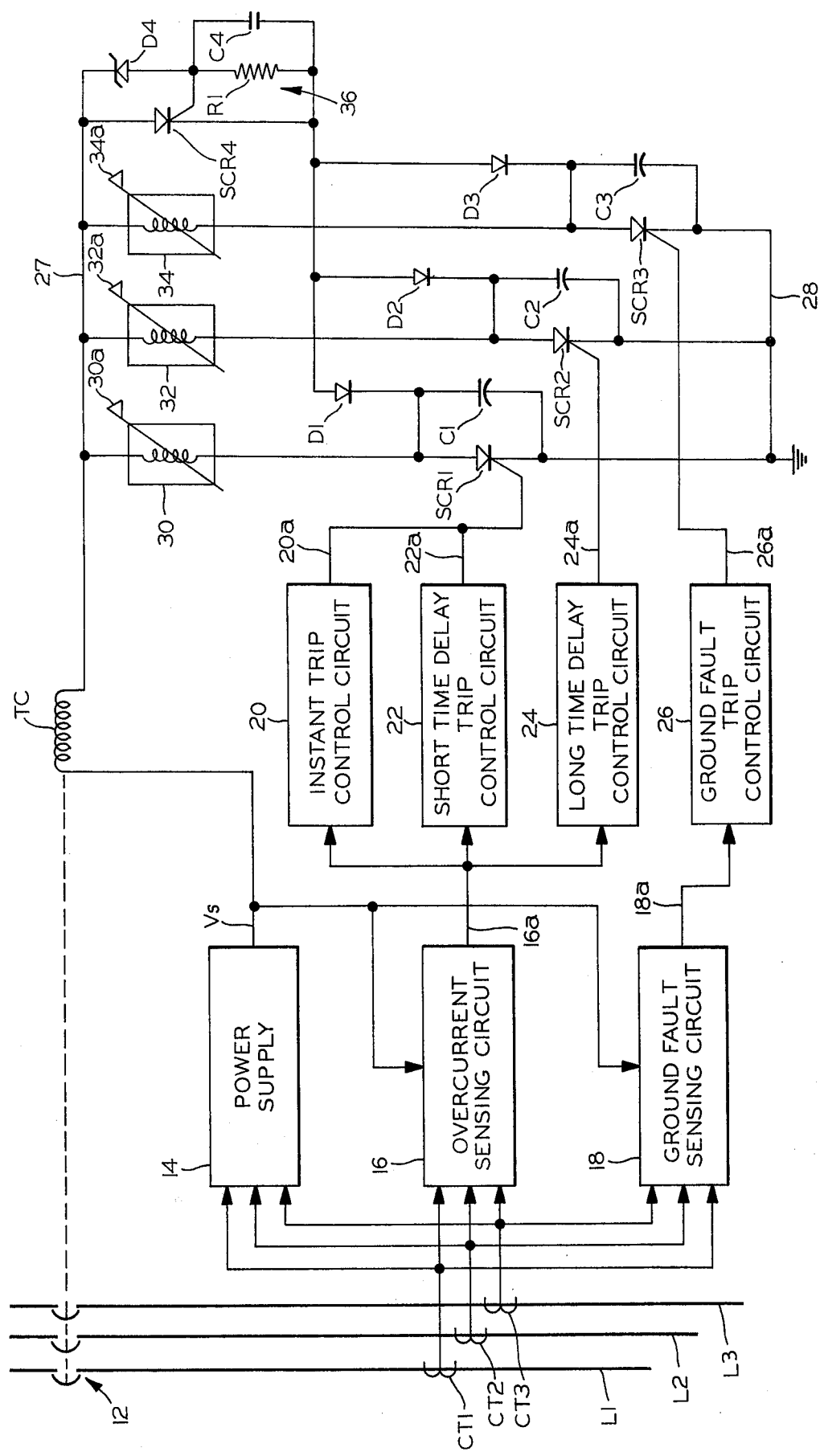

MULTI-FUNCTION SOLID STATE TRIP UNIT WITH TRIP INDICATING MEANS

BACKGROUND OF THE INVENTION

Automatic electric circuit breakers, particularly those designed for industrial applications, are increasingly being equipped with electronic or solid state trip units in lieu of the traditional thermal-magnetic and dual magnetic trip units. These solid state trip units monitor the line current or currents and automatically initiate circuit interruption in response to abnormal line current magnitudes caused by overload and short circuit conditions. Recently, to satisfy demand, solid state trip units have been supplemented to also provide ground fault protection.

With such multi-function trip unit capability, it would be most desirable to know, from a trouble-shooting standpoint, which one of these trip unit functions was responsible for tripping the circuit breaker and clearing the circuit. Specifically, is the problem to be rectified before power can be restored before power can be restored an overload, a short circuit or a ground fault condition? A positive indication of which problem precipitated tripping of the circuit breaker can greatly simplify the search for the problem source and thus corrective action can be taken all the sooner. In industrial applications, loss of electrical power typically means the curtailment or complete halt in production, which is expensive. Thus, it is highly desirable that a power outage, when it does occur, be held to as short a duration as possible.

It is accordingly an object of the present invention to provide an improved multi-function solid state trip unit for automatic electric circuit breakers.

An additional object of the invention is to provide a solid state trip unit of the above character, which includes indicator means for signaling which of the trip units was responsible for tripping the circuit breaker.

Still another object is to provide a solid state trip unit of the above character, wherein the indicating means is operated off the trip unit power supply.

A further object is to provide a trip unit of the above character which further includes means bypassing the indicating means to insure that the completion of a trip unit function is not jeopardized by failure of the indicating means.

Other objects of the invention will in part be obvious and in part appear hereinafter.

SUMMARY OF THE INVENTION

In accordance with the present invention, there is provided a multi-function solid state trip unit for automatic electric circuit breakers, wherein the trip unit includes indicating or target means for signaling which of the trip functions was responsible for tripping the circuit breaker and interrupting the distribution circuit being protected. To this end, the trip unit includes means for sensing the magnitude of the current in each line conductor of an electrical power distribution circuit to detect the existence of overcurrent and ground fault conditions. Upon the detection of an overcurrent condition, the trip unit undertakes appropriate action depending upon the severity of the condition. If the current in any line conductor is found to be of extreme short circuit proportions, the trip unit includes an instantaneous trip circuit which undertakes to initiate a trip function without delay by triggering an electronic switch to complete an energization circuit for a trip coil acting directly or indirectly to unlatch the circuit breaker operating mechanism such that the latter can act forthwith to open the circuit breaker internal contacts.

If the magnitude of the overcurrent condition is less severe, but nevertheless of short circuit proportions, the trip unit includes a short time delay circuit undertaking to initiate a trip function by enabling energization of the trip coil after a discrete, but relatively short time delay. A short time delay trip function is typically implemented for coordination purposes where it is desired to hold off tripping a main circuit breaker to allow a downstream branch circuit breaker also sensing the overcurrent condition the opportunity to clear the fault.

When the magnitude of the line current or currents is found to be in excess of rated current but less than short circuit proportions, thus indicating an overload condition, the trip unit includes still another trip circuit undertaking to initiate a trip function by enabling energization of the trip coil upon the expiration of a relatively long time delay typically determined on an inverse time basis. That is, the duration of the delay established by the long time delay trip circuit is inversely proportional to the severity of the overload condition. Thus, as the overload current magnitude increases the long time delay duration decreases, and vice versa.

Upon detection of a ground fault, the trip unit includes a ground fault trip circuit undertaking to initiate a ground fault trip function by enabling energization of the trip coil to likewise trip the circuit breaker.

To signify which of the various trip functions was operative to trip the circuit breaker and thus identify whether a short circuit, an overload or a ground fault condition exists, the present invention incorporates a plurality of electronic switches electrically connected in parallel with each other and in series with the trip coil. Included in each parallel electronic switch path is an indicator. Each electronic switch is triggered from a different one of the trip circuits, and when triggered, completes an energization circuit not only for the trip coil but also for the indicator. Thus, upon triggering of the circuit breaker, one need only observe which of the indicators has been actuated to determine whether the abnormal condition precipitating the trip was a short circuit, overload or a ground fault.

Since, in accordance with the present invention, the indicators are connected in series with the trip coil, and thus are actuated from the same energy source as is the trip coil, it is manifest that failure of one of these indicators jeopardizes the successful execution of a trip function. To handle this contingency, a bypass current is included to provide an auxiliary current path shunting any indicator whose failure jeopardizes the execution of a trip function. More specifically, the bypass circuit monitors the voltage across the parallel connected indicators and, if upon triggering of one of the electronic switches the voltage across this parallel circuit exceeds a predetermined minimum signifying that the indicator in series with the triggered switch has reduced conductivity, an electronic switch in the bypass circuit is triggered to route trip coil energization current around the defective indicator to the triggered electronic switch.

The invention accordingly comprises the feature of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which the sole FIGURE is a circuit schematic diagram, partially in block form, illustrating an embodiment of the present invention.

DETAILED DESCRIPTION

Referring now to the drawing, the multi-function solid state trip unit of the present invention is illustrated as being implemented to protect a three-phase electrical power distribution circuit consisting of line conductors L1, L2 and L3, wherein the trip unit operates to energize a trip coil TC acting to initiate separation of ganged circuit breakers 12 in response to an overcurrent condition sensed in any one of the three line conductors. The levels of current flowing in each of the line conductors are separately monitored by individual current transformers CT1, CT2 and CT3. The secondary current outputs of these transformers are supplied to a power supply circuit 14, an overcurrent sensing circuit 16, and a ground fault sensing circuit 18. The input circuit configuration, as well as the power supply, overcurrent sensing and ground fault sensing circuits may be constructed in the manner disclosed in Willard U.S. Pat. No. 3,803,455. As illustrated in this patent, the power supply includes full wave bridge rectifying networks for developing a regulated DC supply voltage Vs for powering the overcurrent sensing and ground fault sensing circuits, as well as the trip coil TC. The overcurrent sensing circuit 16 includes cascaded current transformers and a logic network for developing a signal on output lead 16a whose magnitude is proportional to the highest level of current flowing in any one of the line conductors L1, L2 and L3. The ground fault sensing circuit 18 includes a zero sequence transformer capable of developing a signal on its output lead 18a proportional in magnitude to any imbalance in the currents flowing in the line conductors as would represent ground leakage current returning to the source through an unintended ground path.

The signal on output lead 16a of overcurrent sensing circuit 16 is supplied in parallel to an instantaneous trip control circuit 20, a short time delay trip control circuit 22 and a long time delay trip control circuit 24. The signal output from ground fault sensing circuit 18 is supplied over lead 18a to a ground fault control circuit 26. The control circuits 20, 22 and 24 become selectively active depending upon the severity of the overcurrent condition sensed by the overcurrent sensing circuit 16. By way of example, if the current in any one of the line conductors exceeds 10 times rated current, the instantaneous trip control circuit acts forthwith to initiate a trip function. On the other hand, if the current in any one of the line conductors exceeds five times rated current, the short time delay trip circuit imposes a predetermined short time delay, for example 0.3 seconds, before initiating a trip function. It will be appreciated that line currents exceeding 10 times rated current or five times rated current for a duration longer than 0.3 seconds represents a hazardous short circuit condition calling for separation of contacts 12 pursuant to interrupting the distribution circuit. It will be appreciated that these short circuit current threshold settings can be readily adjusted according to user specifications. If the line current in any one of the line conductors exceeds rated current due to an overload condition, the long time delay trip control circuit 24 becomes operative to impose a time delay whose duration is inversely proportional to the degree of overcurrent. Thus, if the line current is only slightly in excess of rated current, the circuit 24 would impose a long time delay of minutes in duration.

Finally, upon the detection of a current imbalance, signifying a ground fault, ground fault control circuit 26 is activated to impose an appropriate delay prior to initiating a trip function.

In the solid state of static trip unit disclosed in the above-noted U.S. Pat. No. 3,803,455, the outputs of the various control circuits are supplied in common to a single electronic switch, typically in the form of a silicon-controlled rectifier or, more generally a thyristor, connected in the energization circuit for the trip coil TC. Thus, for one of the control circuits to initiate a trip function, its output signal triggers the thyristor, converting it to its highly conductive state, and current is drawn from the power supply through the trip coil pursuant to effectuating the trip function and separation of the circuit breaker contacts 12. In accordance with the present invention, a plurality of parallel connected thyristors are implemented, the triggering of any one being effective to complete the energization circuit for the trip coil TC. Thus, as seen in the drawing, thyristors SCR1, SCR2 and SCR3 are connected in parallel between a bus 27, common to the lower end of the trip coil TC and a ground reference bus 28. Output load 20a from the instantaneous trip control circuit 20 and output lead 22a from the short time delay trip control circuit 22 are connected in common to the gate of thyristor SCR1. The output lead 24a of long time delay trip control circuit 24 is connected to the gate of thyristor SCR2, while the output lead 26a of ground fault trip control circuit 26 is connected to the gate of thyristor SCR3. It will be appreciated that control circuits 20 and 22 may be connected to trigger separate thyristors if it is desired to distinguish between which of these control circuits initiated a trip function. However, since operation of either one of the instantaneous and short time delay trip control circuits signifies the existence of a short circuit condition, their joint triggering of a single electronic switch is deemed sufficient.

In order to signal which of the control circuits 20, 22, 24, 26 initiated a trip function, indicators 30, 32 and 34 are individually connected between bus 27 and each thyristor. These indicators may take the form of flux shifters such as disclosed in Kotos, et al Pat. No. 3,894,052, assigned to the assignee of the instant application. These electro-magnetic devices are specially designed to be actuated with very little power, thereby insuring that there is sufficient power available from the power supply 14 to actuate the trip coil.

From the description thus far, it is seen that should thyristor SCR1 be triggered from either control circuits 20 or 22, current is drawn from the power supply 14 through trip coil TC and indicator 30 to bus 28. The trip coil TC is actuated to effectuate separation of the circuit breaker contacts 12, while indicator 30 is likewise actuated to raise a flag 30a associated therewith providing a visual indication that a short circuit condition exists somewhere in the power distribution system. Similarly, if control circuit 24 triggers thyristor SCR2, the trip coil TC is actuated together with indicator 32, thereby raising its flag 32a signifying an overload condition. Finally, if control circuit 26 triggers thyristor SCR3, the trip coil and indicator 34 are actuated, the latter raising its flag 34a to signal the existence of a ground fault on the distribution circuit. Preferably, the indicator flags are manually reset. As seen in the drawing, noise suppression capacitors C1, C2 and C3 are connected across the thyristors SCR1, SCR2 and SCR3, respectively.

As is apparent from the description thus far, successful activation of the trip coil to precipitate a trip function is dependent upon the continuing electrical continuity of the indicators 30, 32 and 34. It is seen that if the indicator in series with a triggered thyristor loses its continuity, current cannot be drawn through the trip coil to precipitate a trip function when called for. In order that the reliability of the circuit interruptor not be prejudiced by the inclusion of the indicators in the trip coil energization circuit, it is a feature of the present invention to include a bypass circuit, generally indicated at 36, which automatically becomes effective to shunt trip coil energization current around a defective indicator to whichever one of the thyristors has been triggered. To this end, the anode of an additional thyristor SCR4 is connected to bus 27 and its cathode is connected in common to each of the anodes of the other thyristors SCR1, SCR2 and SCR3 through diodes D1, D2 and D3, respectively. A zener diode D4 is connected between the anode of thyristor SCR4 and its gate, and a resistor R1 is connected between the gate and cathode of thyristor SCR4. A noise suppression capacitor C4 is connected in shunt with resistor R1.

The zener voltage of zener diode D4 is established at a threshold level which is greater than the voltage normally existing on bus 27 when trip coil energizing current is normally drawn through an indicator in series circuit with a triggered thyristor. However, if this indicator has lost continuity, the voltage on bus 27 sits at the supply voltage Vs, which is sufficient to break down the zener diode D4 such that current flows through resistor R1 to develop a gate voltage firing thyristor SCR4 in the bypass circuit. Energization current for the trip coil TC is thus drawn through thyristor SCR4 in shunt with the defective indicator to insure successful completion of a trip function. However, as long as the various indicators are operable, the bypass circuit 36 merely stands by, leaving the indicators in the trip coil energization circuit to fulfill their intended purpose of indicating the nature of the abnormality in the distribution circuit which precipitated the trip function.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A solid-state trip unit for an electric circuit breaker having circuit interrupting contacts whose separation is initiated by energization of a trip coil, said trip unit including, in combination:
   A. a power supply electrically connected to one terminal of the trip coil;
   B. means monitoring the line current flowing in an electrical power distribution circuit;
   C. a first trip control circuit electrically connected to said current monitoring means and operative in response to a first abnormal line current condition;
   D. a second trip control circuit electrically connected to said current monitoring means and operative in response to a second abnormal line current condition;
   E. a first electronic switch connected to the other terminal of the trip coil and triggered by said first trip control circuit to draw trip coil energization current from said power supply through the trip coil upon the existence of said first abnormal line current condition;
   F. a second electronic switch electrically connected in parallel to said first electronic switch and triggered by said second trip control circuit to draw trip coil energization current from said power supply through the trip coil upon the existence of said second abnormal line current condition;
   G. a first indicator connected in series circuit with the trip coil and said first electronic switch and energized by trip coil energization current upon triggering of said first electronic switch to signal the existence of said first abnormal line current condition;
   H. a second indicator connected in series with the trip coil and said second electronic switch and energized by said trip coil energization current upon triggering of said second electronic switch to signal the existence of said second abnormal line current condition; and
   I. a common bypass circuit including the parallel combination of a third electronic switch and voltage sensing means connected between a first bus common to one side of each said indicator and a second bus separately connected to the other side of each said indicator, whereby, upon the triggering of one of said first and second electronic switches by its associated trip control circuit, said sensing means, operating in response to a voltage exceeding a predetermined threshold as occasioned by the one indicator series connected with said one electronic switch having insufficient electrical continuity to insure adequate energization of the trip coil, triggers said third electronic switch to conduct trip coil energization current around said one indicator to said one electronic switch.

* * * * *